April 15, 1930.   C. R. OSGOOD   1,754,522
STRAW WILTER
Filed Jan. 16, 1929   3 Sheets-Sheet 1
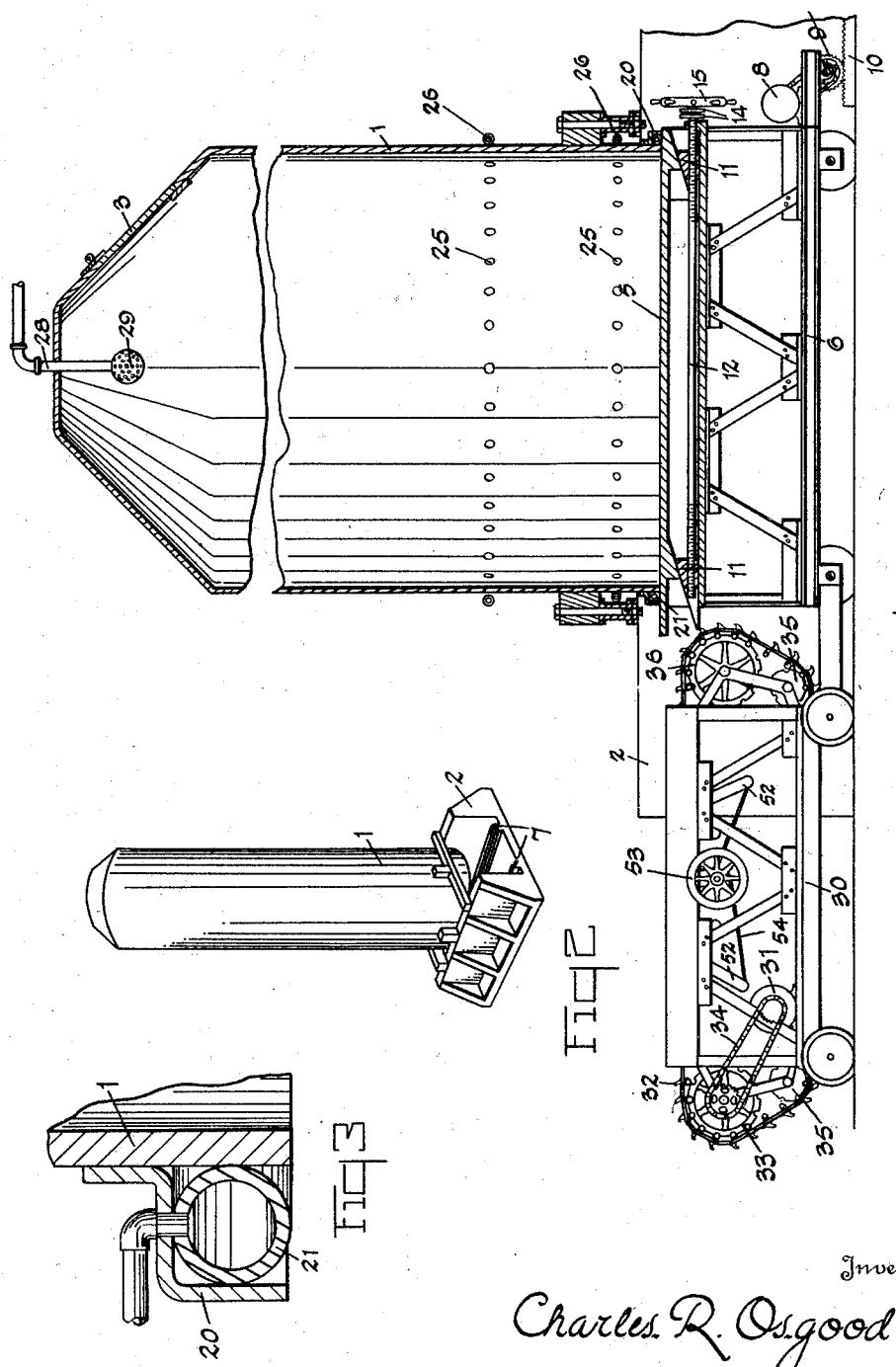
Inventor
Charles R. Osgood
By Faust R. Crampton
Attorney

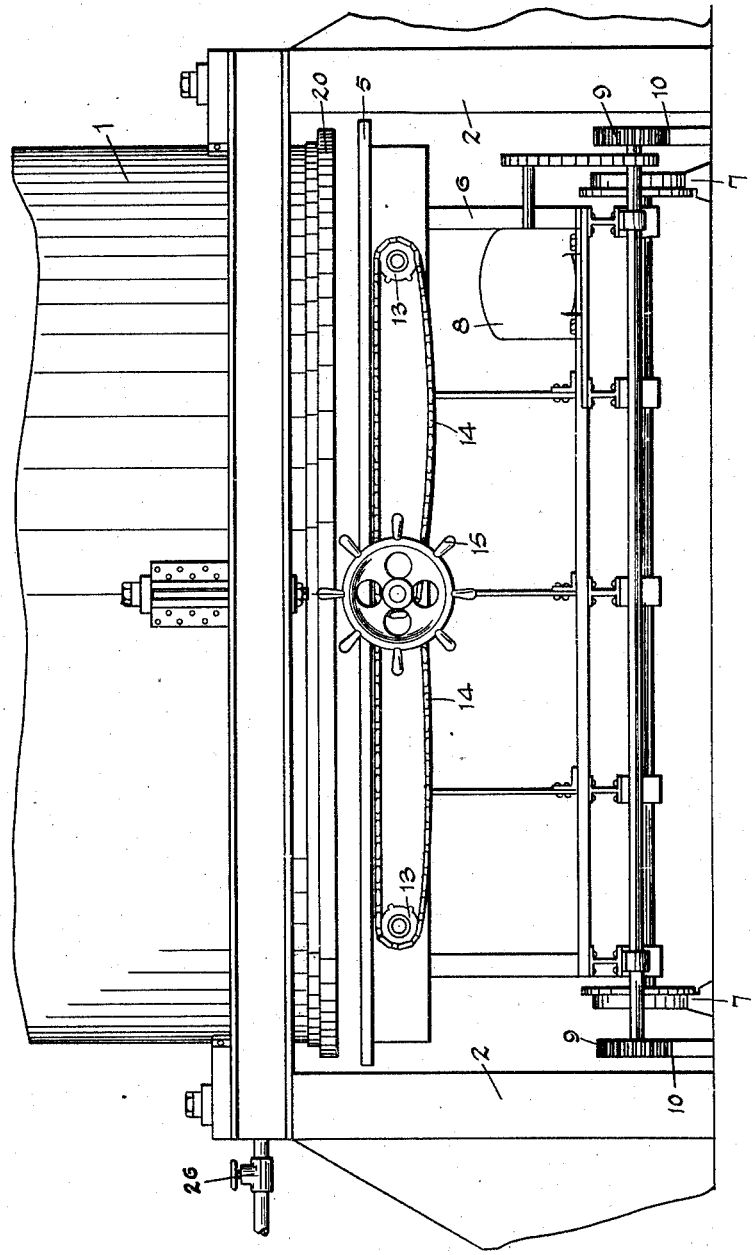

April 15, 1930.  C. R. OSGOOD  1,754,522
STRAW WILTER
Filed Jan. 16, 1929  3 Sheets-Sheet 3
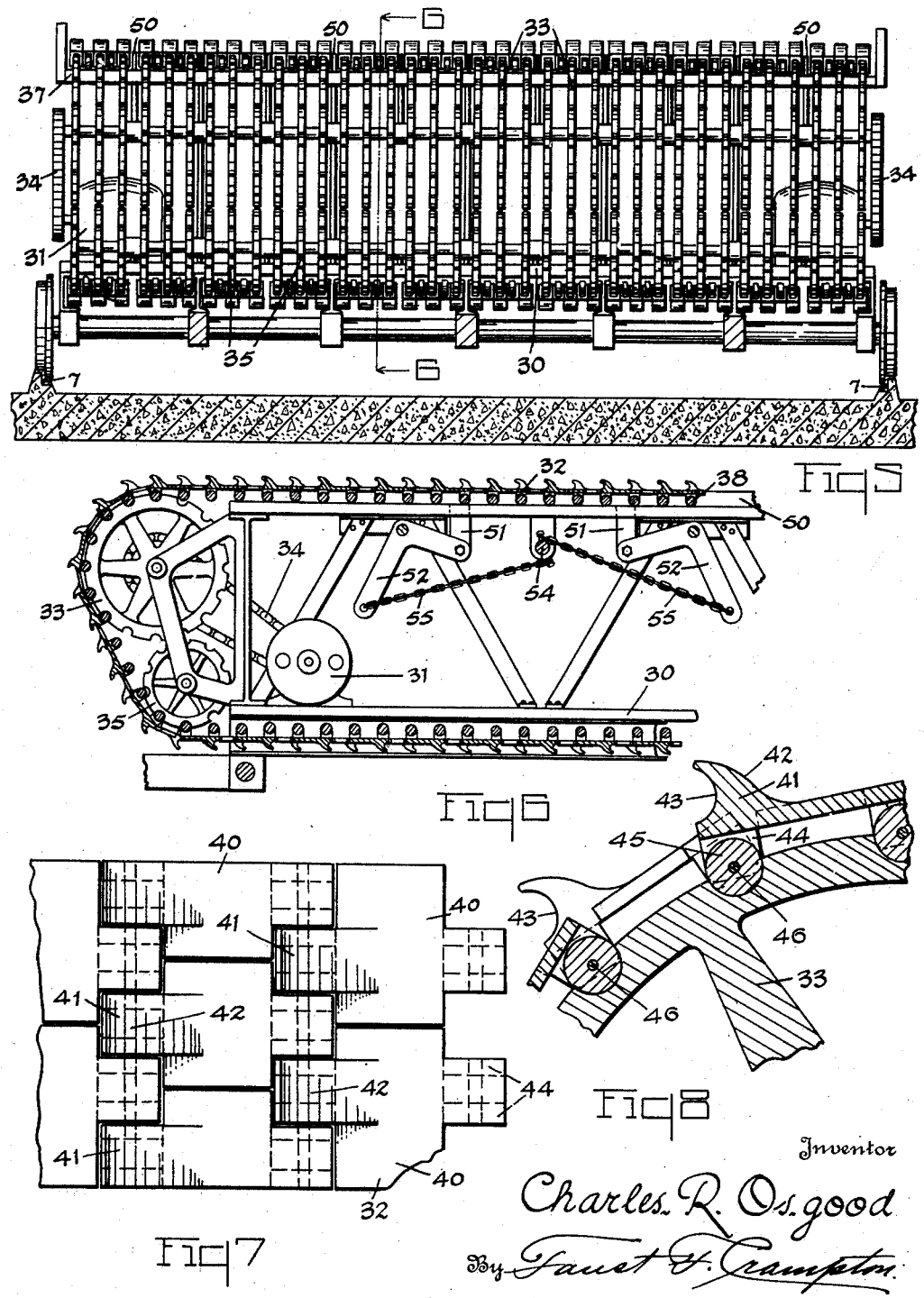

Patented Apr. 15, 1930

1,754,522

UNITED STATES PATENT OFFICE

CHARLES R. OSGOOD, OF MONROE, MICHIGAN

STRAW WILTER

Application filed January 16, 1929. Serial No. 332,828.

My invention has for its object to provide an apparatus for reducing the time required for "cooking" straw and other fibre-producing material in paper manufacture. As is well known in connection with the paper manufacture, where material such as straw is used, the straw is cooked or treated with a hot solution of caustic soda in rotary drums. During the operation of cooking, the straw continuously wilts and reduces the space occupied thereby within the drums and, consequently, the drums have to be stopped from time to time and new straw packed into the drums until they are again filled, whereupon the cooking continues until the next filling. The drums, during the cooking of a certain quantity of straw, have to be stopped a large number of times and the straw is packed within the atmosphere created by the rising steam and boiling caustic, which is exceedingly obnoxious to those operating above the drums and, owing to the fact that the filling is progressive, while the cooking proceeds, some of the straw is only partially cooked, particularly those portions that are inserted at the latter end of the cooking operation. The drums are substantially spherical in form, preferably slightly irregular in their contour in order to produce the desired agitation of the solution as it moves through the straw within different parts of the drums and, because of the shape and the rotative movements of the drums, the openings therein are necessarily small, which increases the time required for each filling and packing during the cooking process, with the result that the time required for the thorough cooking of all of the straw, within the drums, is greatly extended.

My invention has for its object to greatly reduce the time expended in the cooking operation, to eliminate the periodical stopping and starting of the drums as well as to eliminate the necessity of the work required to pack the drum a number of times during a single cooking operation, and to provide for the uniform treatment of the straw by the caustic solution to produce a uniform product for the admixture of other materials according to the methods and processes well known in paper manufacture.

My invention consists in providing an apparatus for wilting the straw by steam in advance of the cooking in the caustic solution, whereby the straw will be reduced in volume and will be softened and in condition to be more readily inserted in the drums and more rapidly affected by the caustic solution. When, therefore, rotary drums are packed with the wilted straw, there will be substantially no reduction in the volume occupied by the straw during the treatment of the straw with the caustic solution and, consequently, the rotary drums will remain substantially filled with the straw. This will eliminate stopping of the rotary drums for frequent fillings during the cooking operation and all parts of the straw will be treated with the solution for the same period of time. The invention also provides for compressing the straw by its own weight as it wilts thus producing a condition within the stalks that will facilitate the introduction of a large quantity of the straw in the drums, since the resiliency of the fibre is not only broken down, but each stalk is compressed during the wilting operation to cause it to eliminate all voids within itself.

The invention may be contained in apparatus of different forms and, to illustrate a practical application of the invention, I have selected a particular construction embodying the invention as an example of such structures and shall describe it hereinafter. The particular apparatus selected as an example is shown in the accompanying drawings.

Fig. 1 illustrates a part of the apparatus in section and side view of a part of the apparatus. Fig. 2 illustrates the wilting tank and its foundation in perspective and is for the purpose of giving an idea of the relative dimensions of the wilting tank and its supporting foundation. Fig. 3 illustrates a means for sealing the bottom of the wilting tank. Fig. 4 illustrates the lower end of the wilting tank and an end view of a part of the apparatus. Fig. 5 illustrates a plurality of sprocket wheels for driving the raking belts for removing the wilted straw from the wilting tank. Fig. 6 illustrates a view of a section taken on the plane of the line 6—6 Fig. 5. Fig. 7 illustrates a top view of a part of one of the raking belts for removing the straw from the wilting tank. Fig. 8 illustrates a view of a section of the belt and the sprocket wheels for operating the belt.

The witling tank 1, wherein the straw is wilted preparatory to its being cooked, may be of a considerable height, such as forty feet, and have a diameter of ten or fourteen feet in order to provide for the rapid cooking that may be performed in three or four drums by reason of the previous wilting. It is supported on a suitable foundation of concrete or other substructure whereby it may be properly supported. The upper end of the wilting tank may be provided with a suitable large door 3 into which the straw may be continuously introduced as it is wilted in the lower part of the tank by the use of steam and the hot water into which the steam condenses. The tank is made high in order that the weight of the straw will continuously pack down and compress the straw located in the bottom, while the straw, located in the bottom, is being wilted and settles and portions thereof are removed from the bottom from time to time.

The bottom of the tank 1 is closed by means of a plate 5, which may be raised and lowered by any suitable mechanism and may be placed in position or removed therefrom by a suitable conveyor. In the form of construction shown, the plate 5 is supported on a truck 6 that may be located upon a suitable track 7 and operated by an electric motor 8 that drives gear wheels 9, which meshes with the racks 10. The plate 5 is raised and lowered by a plurality of cams or wedges, such as the wedges 11, that may be operated by screws 12. A plurality of sets of wedges 11 are used and a screw 12 may be used for operating each set of wedges. These screws 12 may be interconnected by means of sprocket wheels 13 and sprocket chains 14 and they may be operated at the same time by means of the hand wheel 15, which is also connected to the sprocket chains 14. Thus all parts of the plate 5 may be lifted against the lower edge of the tank 1. In order to seal the bottom of the tank as against the escape of steam and water, the lower edge of the tank may be provided with a channel that may be formed with a Z-iron 20 that is located on the exterior of the tank and a flexible pipe, such as a rubber tube, 21, of considerable size may be located in the channel and secured to the web of the Z-iron 20. When, therefore, the plate 5 is raised, it will close the channel formed between the lower edges of the tank 1 and the lower edge of the Z-iron 20. The tube 21 may then be connected with a source of supply of air under pressure, which will cause the tube to press against the top of the plate 5 and seal the interior of the tank as against the escape of the steam or water which is introduced into the tank for wilting the straw.

The steam is introduced through a plurality of openings 25 located near the lower end of the tank. A pipe 26 is connected to the openings 25 for the introduction of steam into the tank, the steam permeates the straw and condenses. Since the tank is substantially filled with the straw, the steam rises and wilts a large portion of the straw and condenses and flows down through the spaces between the stalks of the straw and the straw is progressively wilted and compressed by the weight of the straw above it, the hot water being displaced and caused to move upward towards the less wilted straw, the steam, however, entering through the port holes 25 maintains upwardly extending flues or passageways through the straw, which operates to maintain the water hot. If desired, a plurality of rows of ports may be located at different heights in order to permit admission of steam into the tank at different heights. Also, if desired, hot water or steam may be introduced at the top of the tank, such as through the pipe 28 that terminates in a suitable distributing nozzle 29. This will produce preliminary wilting as the straw is introduced into the tank 1 through the door 3 and cause more rapid settling of the straw.

When it is desired to remove some of the straw from the tank, the plate 5 is lowered by rotation of the hand wheel 15 and the truck 6 is drawn from beneath the tank 1, while at the same time a truck 30, that trails the truck 6, is drawn beneath the tank 1. The truck 30 is provided with a plurality of raking or conveying belts 32 and one edge of the plate 5 overhangs the raking or conveying belts. When the truck 6 is drawn from beneath the tank 1, the truck 30 will be located beneath the tank 1 and, by the operation of the motor 31, the raking belts 32 will draw the straw from beneath the edge of the tank 1. The raking belt may deliver the straw to suitable conveyors, which may hoist or convey the wilted straw to suitable platforms located in proximity to the rotary drums, whereby the rotary cooking drums may be readily filled.

The raking belts 32 are operated by a plurality of sprocket wheels 33 located on the shaft which is driven by means of the motor 31 through the sprocket chain 34. Suitable idle sprocket wheels 35 and 36 operate to guide the raking belts in their movement so as to maintain legs or parts of the belts parallel to the plane of the lower edge of the tank 1. Preferably, the truck 30 is provided with a plate 37 and the sections of the belts are provided with rollers 38 that ride upon the surface of the plate 37. The plate 37, being located parallel to the plane of the edge of the tank 1, operates to support the chains in position as they receive the weight of the straw from the tank 1.

The belts 32 are formed on a plurality of links 40 made in the form of plates, each having a broad protruding tooth 41 that has a sloping surface 42 on its upper side, preferably curved so as to reduce engagement of the straw upon delivery. Also, the tooth 41 is provided with a curved straw engaging surface 43 located on the leading side of the tooth substantially as shown in Fig. 8. Each belt 32 is provided with lugs 44 and rollers 38 are pivotally supported by the rods 46 between the lugs 44. The lugs 44 permit movement of the belts over the plate 37 while they are removing the straw and are subjected to the pressure of the weight of the straw in the tank.

In order that the weight of the straw may be sustained and in case one or more of the belts should break, I have provided a plurality of bars 50 that are located between the belts 32, which extend over the top of the plate 37, and means for lifting the bars 50 above the height of the teeth 41 and thus to lift the straw above the belts and so as to clear the teeth. In case one or more of the belts should break during the removal of straw from the bottom of the tank, two or more of the bars may be raised and the broken belt may be removed from between the bars, and, if desired, the belt may be mended and reinserted in position or the remaining belts may be utilized for drawing the straw from beneath the edge of the tank 1. The bars 50 may be raised by any suitable means.

In the particular form of construction shown, the bars are provided with a plurality of lugs 51 which are connected to the arms of bell-crank levers 52 that are pivotally supported on suitable parts of the frame of the truck 30. The bell-crank levers 52 may be operated by means of a suitable hand wheel 53 which may be connected to a shaft 54 suitably supported in the frame of the truck 30. The shaft 54 is connected by means of chains 55 to the bell-crank levers 52 so that when the shaft 54 is rotated by the hand wheel 53, the bars 50 will be raised, which will operate to raise the straw and permit a substantially free movement of a belt. The broken belt may thus be removed and, after its removal, the bars 50 may be lowered and the belt may continue in its operation to remove the straw from beneath the edge of the wilting tank 1.

When all of the wilted straw has been removed, the truck 6 is moved beneath the tank 1, pushing before it the truck 30. The belts 32 continue to operate to remove the straw that may be pushed ahead of the plate 5. The plate 5 is raised to a point close to the height of the edge of the tank in advance of the return movement of the truck 6, and, consequently, practically no straw will be left protruding from beneath the edge of the tank 1. The plate 5 is then raised against the edge of the tank and the tube 21 is inflated which seals the tank 1 against any escape of steam or water located in the tank.

I claim:

1. In a straw wilting tank, a removable plate for closing the bottom of the tank, a raking belt, and a movable frame for supporting the belt and connected to the plate.

2. In a straw wilting tank, a removable plate for closing the bottom of the tank, a raking belt, a movable frame for supporting the belt and connected to the plate, and means for forcing the plate against the edge of the tank.

3. In a straw wilting tank, a removable plate for closing the bottom of the tank, a raking belt, a movable frame for supporting the belt and connected to the plate, means for forcing the plate against the edge of the tank, and a pneumatic sealing means for sealing the interior of the tank as against escape of fluids between the edge of the tank and the plate.

4. In a straw wilting tank, a removable plate for closing the bottom of the tank, a raking belt, a movable frame for supporting the belt and connected to the plate, and means for introducing steam into the bottom of the tank.

5. In a straw wilting tank, a removable plate for closing the bottom of the tank, a raking belt, a movable frame for supporting the belt and connected to the plate, means for introducing steam into the tank at different heights above the bottom of the tank.

6. In a straw wilting tank, a pair of trucks, one of the trucks having a plate for closing the bottom of the tank, means located on the truck for raising the plate against the bottom of the tank, a raking belt located on the other of the said trucks, and means for operating the trucks to locate one or the other of the trucks beneath the bottom of the tank.

7. In a straw wilting tank, a pair of trucks, one of the trucks having a plate for closing the bottom of the tank, cams for raising the plate against the bottom of the tank, a raking belt located on the other of the said trucks, means for operating the trucks to locate one or the other of the trucks beneath the bottom of the tank, one end of the plate overhanging a part of the belt, and means for introducing steam into the bottom of the tank.

8. In a straw wilting tank, a movable plate for closing the bottom of the tank, a plurality of raking belts, and a movable frame for supporting the belts and connected to the plate, bars located between the belts, and means for raising the bars to remove the weight of the straw from the belts.

In witness whereof I have hereunto signed my name to this specification.

CHARLES R. OSGOOD.